United States Patent Office 3,557,040
Patented Jan. 19, 1971

3,557,040
PROCESS FOR PREPARING A CARBON BLACK-SYNTHETIC RESIN COMPOSITION
Naomitsu Takashina, Fujisawa-shi, and Tetuo Aida, Yasuhiro Endo, and Wakio Nagashima, Hiratsuka-shi, Japan, assignors of one-half each to Japan Gas-Chemical Company, Tokyo, Japan, a corporation of Japan, and Research Development Corporation of Japan, Tokyo, Japan, a corporation of Japan
Filed Aug. 14, 1967, Ser. No. 660,420
Int. Cl. C08f 45/08, 47/18
U.S. Cl. 260—29.6                                        8 Claims

ABSTRACT OF THE DISCLOSURE

A process for preparing a carbon black-synthetic resin composition which comprises contacting at least one kind of $\alpha,\beta$-ethylenically unsaturated monomer polymerizable with free radicals with a polymerization initiator in the presence of carbon black, characterized in that said initiator is added in at least 2 divided times, namely, once prior to the initiation of the polymerization, and next after fluidity of the reaction mixture increases, and a non-thixotropic carbon black dispersion obtained by the aforementioned process.

---

The present invention relates to a process for preparing a carbon black-synthetic resin composition, further to a novel carbon black-synthetic resin composition showing good dispersibility in an organic medium or aqueous medium.

Upon preparing a dispersion in an organic or aqueous medium having a high content of carbon black, it has been difficult to uniformly disperse carbon black in the medium and the dispersion has been showing an extremely high thixotropy in which there has been a large problem. Even when a liquid medium in an amount for exceeding the oil absorption of carbon black was used it has been difficult to prepare a dispersion having good fluidity and excellent dispersion stability by mechanical means such as roll mill or ball mill. This problem has not been easily solved even if amines, surface active agent, and fatty acid soaps were used as dispersing agents, especially preparation of a liquid dispersion having good fluidity with high carbon black content has been difficult. Practically, the uses requiring a stable dispersion having high carbon black content are many, such as an electro-conductive paint pigment with low electric resistance, pigment masterbatch as a black pigment, antistatic agent for rubber and so on, and in many cases such dispersion is used in the form of paste or liquid having higher fluidity than that.

As processes for preparing carbon black dispersion, there have been many physical or chemical processes such as mechanically dispersing carbon black particles in the presence of dispersing agent as mentioned above, oxidation of the surface of carbon black with a strong oxidizing agent, addition of an amine to carboxyl group on the surface of carbon black to convert said group to an amine salt or an acid amide, or free radical polymerization of vinyl monomer in the presence of carbon black.

However, in these known processes, dispersibility of treated carbon black particles has not been satisfactory and even if a dispersion having low carbon black content should be able to be prepared, it has been difficult to prepare a dispersion having high carbon black content usable in the aforementioned uses.

An object of the present invention is to provide a carbon black-synthetic resin composition which is very easy to disperse at a high content of carbon black in an organic medium and an aqueous medium and having good fluidity even when dispersed in these media, and a dispersion thereof.

The present inventors have found that upon preparing a carbon black-synthetic resin composition by contacting at least one kind of $\alpha,\beta$-ethylenically unsaturated monomer with a polymerization initiator, when said initiator is added in at least 2 times, namely a part of the said initiator is added prior to the initiation of polymerization and the rest is added after fluidity of the reaction mixture increases, dispersibility of the produced carbon black-resin composition and fluidity of a dispersion containing the same are remarkably improved.

Namely, the carbon black-synthetic resin composition of the present invention is characterized in that generally it shows nonthixotropic Newtonian flow in an organic medium, or even when it shows thixotropy in its minor extent and shows fluidity considerably close to Newtonian flow, or in case of what is dispersible in an aqueous medium, even if Newtonian flow cannot be expected because of polyelectrolyte with hydration of a high degree, in spite of its high carbon black content it has low viscosity and high fluidity.

It has been known that carbon black is a free radical trap. This function is considered to be due especially to quinone structures among oxygen-containing groups on the surface of carbon black, which considerably effectively inhibit or retard free radical polymerization. Also there is a possibility of chain transfer by hydrogen atom structurally. It is possible to utilize such chemical property to trap polymer radicals onto the surface of carbon black to change the surface condition and it has been known to polymerize vinyl monomer in an amount excess by weight ratio to carbon black to increase dispersibility of carbon black.

However, according to this known process, a considerable part of the added monomer remains unreacted and it is generally not easy to remove this unreacted monomer from a carbon black-synthetic resin composition. And when, from said composition the unreacted monomer is removed by, for instance, evaporation to dryness, the obtained solid carbon black-synthetic resin composition only shows dispersibility in a medium same as that of a mere mixture of a synthetic resin with carbon black. Namely, according to this known method, a large portion of carbon black particles remains intact and dispersibility of carbon black is not recognizably improved.

Whereas, in the present invention by adding a polymerization inhibitor to a polymerization system in at least 2 times, namely adding a part of the initiator prior to the initiation of polymerization and adding the rest when fluidity of the reaction mixture increases, whereby heightening conversion of the system, in other words, by almost completing the polymerization it becomes possible to provide a carbon black-synthetic resin dispersion excellent in fluidity and stability by heightening conversion of the monomer to a polymer whereby substantially eliminating remaining of the unreacted monomer, at the same time, chemically partially destroying the chain structure of carbon black. Thus, in the present invention, it is possible to provide a carbon black-synthetic resin composition showing good dispersibility in a high solid and carbon black content where concentration of the non-volatile portion is above 40%, carbon black content in the non-volatile portion is above 30%, preferably above 50% but below 95%, completely failing to show thixotropy or even if showing thixotropy it is a minor extent as compared with that of what is obtained by mixing carbon black per se by mechanical dispersion in a polymer solution.

In the present invention, as what is usable as material carbon black is any one of channel black, furnace black, acetylene black and lamp black showing reactivity to a free radial and selection thereof is to be decided by use of the resulting dispersion. Of these carbon blacks, what shows remarkable advancement of fluidity is furnace black having a relatively high pH value and high structure. It is preferable to add these carbon blacks to the polymerization system in a sufficient amount so that carbon black content in a carbon black-synthetic resin composition may become 30–95% by weight, especially 50–95% by weight.

According to the present invention whatever is usable insofar as it is an α,β-ethylenically unsaturated monomer. These monomers are usable either singly or in combination with other monomers. When monomers preferably usable in the process of the present invention are illustrated, a monomer represented by the general formula

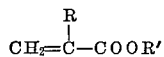

(wherein R is hydrogen atom or methyl group, and R' is hydrogen, hydrocarbon group having 1–16 carbon atoms, or hydroxy-, glycidyl- or N,N-dialkylaminoalkyl-substituted hydrocarbon), for instance, acrylic acid, methacrylic acid, or esters of these acids; acryl or methacryl amide and N-methylol compounds thereof; acrylonitrile; methacrylonitrile; vinyl acetate; styrene and derivatives thereof; vinyl ethers; N-vinyl pyrrolidone; maleic anhydride; itaconic acid, crotonic acid and esters thereof may be cited. These monomers are preferably added to the polymerization system in an amount sufficient to make the polymer content (containing a polymer bound to carbon black and a free polymer) in a carbon black-synthetic resin composition 5–70% by weight. It goes without saying that it is unnecessary to add the entire amount of these monomers prior to initiation of the polymerization, but at first a part thereof may be added and the remaining part may be added later.

As a polymerization initiator, azo compounds especially azobisnitriles such as 2,2′-azobisisobutyronitrile, 2,2′-azobispropionitrile and 2,2′-azobisvaleronitrile; and peroxides such as benzoyl peroxide, cumene, hydroperoxide, t-butyl-hydroperoxide and di-t-butyl peroxide are usable.

In the present invention, of the aforementioned initiators, it is especially preferable to use azobisnitriles, while an organic peroxide is also usable, though in some cases carbon black shows inhibition of polymerization on the contrary, being not preferable.

It is preferable to use the aforementioned initiators in an amount of 0.1–10% by weight based on the amount of monomers in order to eliminate inhibition or retardation of polymerization by carbon black and then complete the polymerization. The polymerization may be carried out in an inert atmosphere at a temperature of 20–150° C. The inert atmosphere can easily be attained by degassing the reaction vessel or filling the reaction vessel with an inert gas such as nitrogen. A preferable polymerization temperature varies depending upon kinds of initiator and monomer used. However, generally it is within the range of 50–90° C. The polymerization may be carried out in the optional presence of a solvent, however, generally it is preferable to use an inert solvent dissolving the initiator, the monomer used and the produced free polymer. The solvent used varies depending upon kinds of monomer and initiator, however, it may be properly selected from solvents consisting of ketones such as acetone, methyl ethyl ketone and methyl isobutyl ketone; alcohols such as methanol, ethanol, isopropanol and butanol; N,N-dialkylcarboamides such as N,N-dimethylformamide and N,N - dimethylacetamide; ethers such as dioxane, ethylene glycol monomethyl ether, ethylene glycol monoethyl ether, ethylene glycol monobutyl ether; and hydrocarbons such as benzene, toluene, xylene, cyclohexane and heptane.

In case of free radical polymerization of vinyl monomers in the presence of a relatively large amount of carbon black, the molecular weight of the produced polymer becomes considerably low as compared with a case wherein vinyl monomer alone is polymerized, however, it is possible to concurrently use a chain transfer agent like dodecyl mercaptan to control the molecular weight.

In the present invention, at least one kind of α,β-ethylenically unsaturated monomer, carbon black and a solvent when desired are added to the polymerization system, further, an initiator in an amount corresponding to $\frac{1}{10}$–$\frac{3}{4}$ of the total amount is added thereto.

At this stage prior to initiation of the polymerization, the reaction system is maintained in a form of a wet mass, and stirring is almost impossible. However, 30 minutes to 5 hours, more particularly within 30 minutes to 3 hours after initiation of the reaction, the reaction mixture abruptly comes to have fluidity. Conversion at this stage is generally within the range of 1–50%.

In the present invention, after this stage the rest of the initiator is added to the polymerization system in 1–5 times. Thus, more than 90%, for instance, more than 98% of the monomer used can be converted to the corresponding polymer.

Thus, according to a preferable embodiment of the present invention, a non-thixotropic carbon black dispersion comprising a carbon black-synthetic resin composition obtained by polymerizing an α,β-ethylenically unsaturated compound in the presence of carbon black and recovering said composition without drying in a liquid medium, wherein said carbon black-synthetic resin composition exists at a concentration of 40–60% by weight, amount of carbon black being 30–95% by weight, preferably 50–95% by weight of said carbon black-synthetic resin composition, said synthetic resin being at least one kind of α,β-ethylenically unsaturated compound polymer having an average molecular weight of 500–50,000, said synthetic resin consisting of what is chemically bonded to carbon black particles and what is dissolved in said liquid medium, said dispersion not substantially containing any unreacted monomer is obtained.

The accompanied drawings will help to explain the present invention better.

Figure 1:
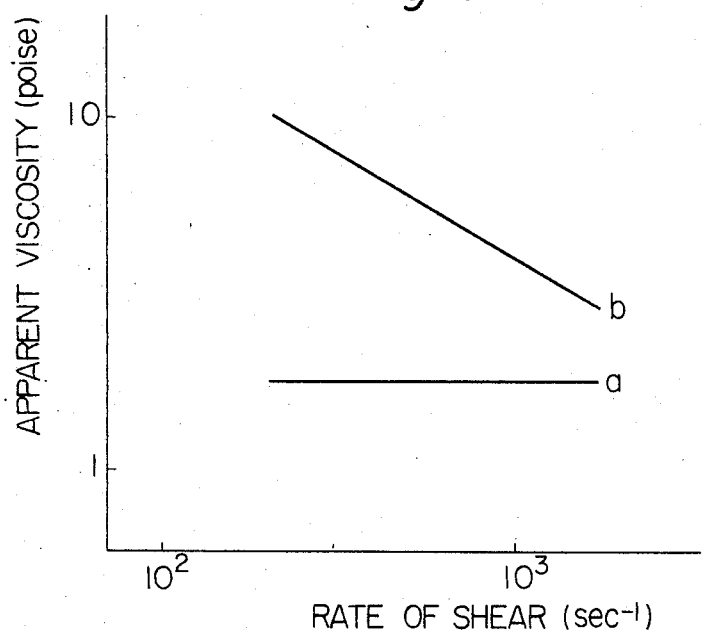
FIG. 1 is a graphic illustration of the relationship between rate of shear and viscosity of the carbon black dispersion of the present invention a and a carbon black dispersion outside the scope of the present invention b.
Figure 2:
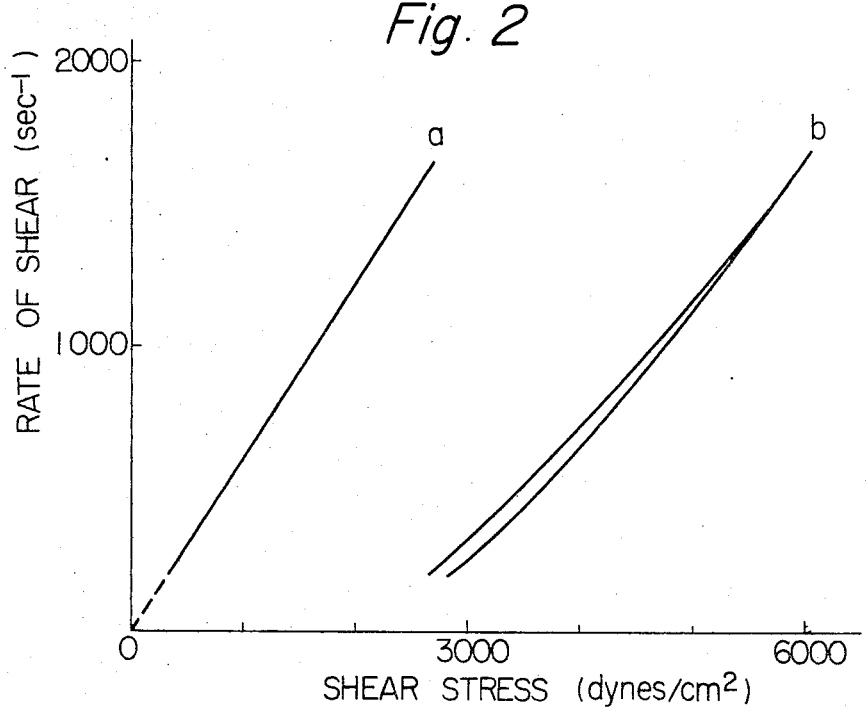
FIG. 2 is a graphic illustration of the relationship between shear stress and rate of shear.

As will be apparent from said FIGS. 1 and 2, it is understood that the carbon black dispersion a does not show thixotropy substantially even when its carbon black content is high, and has fluidity almost close to a Newtonian flow.

However, the carbon black dispersion of the present invention is not limited to what shows said Newtonian flow, but contains what is non-thixotropic, but shows dilatancy. For instance, a carbon black dispersion obtained by using an α,β-unsaturated compound having a basic group such as amines, for instance, dimethyl (or diethyl) aminoethyl methacrylate as one component shows remarkable dilatancy in an organic medium. The reason is considered due to association of amine in the polymer chain with an acidic group on the surface of carbon black. What has such characteristics is contained in the scope of the composition of this application.

It should be understood that even a dispersion showing such fluidity characteristics has a remarkable advantage in that it is non-thixotropic as compared with a known carbon black dispersion.

The carbon black-synthetic resin composition according to the present invention may be used per se as a dispersion obtained by a reaction or after adding a solvent or after replacing the solvent by another solvent in the field as paint and pigment, and especially it is useful as a low-resistant electroconductive paint or pigment.

Also the carbon black-synthetic resin composition of the present invention may be modified by known modification means, thereafter may be used in various fields.

For instance, it is possible to use acrylamide or methacrylamide as a monomer and introduce N-methylol group to the obtained carbon black composition with formaldehyde in the presence of a proper catalyst (for instance, maleic anhydride).

A carbon black-synthetic resin composition using a monomer having a reactive groop such as —OH, —NHR, —CONRCH$_2$OH, —CONHR and

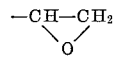

(wherein R is H or a hydrocarbon group) of these monomers may be made the synthetic resin of the composition thermosetting by acting thereon a theremosetting resin such as epoxy resin, amino resin like melamine resin; phenol resin and alkyd resin.

Further, using as monomer or comonomer $\alpha,\beta$-ethylenically unsaturated carboylic acid or a derivative thereof, a carbon black-synethetic resin composition comprising a polymer having carboxylic acid is formed and by treating said composition in an aqueous medium with ammonia, water-soluble amine or lower aliphatic amines, said composition is made an aqueous dispersion. In such system, influence as a polyelectrolyte is great, and according to measuring by a rotary cylinder viscometer, as shown in examples, Newtonan flow does not exist, but as compared with a simple mixture of the same composition, said dispersion is low in viscosity, excellent in fluidity and dispersion stability.

As said monomer or comonomer, there are acrylic acid, methacrylic acid, crotonic acid, itaconic acid, maleic anhydride and fumaric acid. Further a monomer capable of producing carboxyl group by hydrolysis, for instance, a lower alkyl ester of acrylic acid or methacrylic acid may be used. It is preferable that the composition of this type contains 10–100 mole percent of polymerized $\alpha,\beta$-unsaturated carboxylic acid based on the polymer.

By treating a carbon black-synethetic resin composition containing a polymer containing carboxyl group in water with ammonia, water-soluble amines and lower alkyl amines in an amount above 0.5 time of equivalent of the acid, said composition becomes fluid aqueous slurry in spite of having a high solid content. In this case, as water-soluble amine used, mono-, di- and tri-ethanol amine and morpholine are suitable and as lower alkyl amine, mono-, di- and tri-methyl amines and mono-, di- and tri-ethyl amines are suitable.

It is preferable that the solvent used not only dissolves the initiator, the monomer used and the produced free polymer, but also it is water-soluble from the viewpoint of removing the solvent by washing with water or adding water to the reaction product per se to make it aqueous medium dispersion type.

The aqueous dispersion so obtained is used for the production of electroconductive rubber by mixing said dispersion with natural or synthetic rubber latex or electroconductive paper by mixing said dispersion with pulp in a paper manufacturing process and is suitable for uses as pigment for electroconductive paint by mixing said dispersion with a water-soluble resin and as black pigment in electrophoretic paint.

Further, it is possible, to use as monomer or comonomer $\alpha,\beta$-ethylenically unsaturated compound having dialkyl amino alkyl group, treat with an acid the obtained carbon black-synthetic resin composition and make said amino group in the form of a salt. Or it is possible to treat said composition containing resin having dialkylamino alkyl group with methyl iodide and dimethyl sulfate to make said amino group in the form of quaternary ammonium salt. These modified compositions all easily disperse in an aqueous medium, giving highly stable carbon black aqueous dispersions.

Next, the persent invention will be explained with reference to the following examples.

EXAMPLE 1

A reaction vessel equipped with a stirrer was charged with 100 parts of furnace black (GPF grade: oil absorption: 160 cc./100 g. pH: 8.0, iodine adsorption: 29 mg./g.) 100 parts of butyl acrylate, 200 parts of ethylene glycol monoethylether and 0.5 part of 2,2'-azobisisobutyronitrile. The air inside the vessel was sufficiently replaced by nitrogen, thereafter the contents were gradually stirred and heated to 75° C. to initiate polymerization. Such way, after 2 hours conversion became 5%, structural viscosity of the reaction mixture extremely lowered and fluidity increased, at this point further 0.6 part of 2,2'-azobisisobutyronitrile was added and after 3 hours, the conversion became 20%, where further 1 part of the initiator was added and after 3 hours, the conversion became 77%, further 1 part of the initiator was added and after 2 hours, the conversion became 98.5%. When the average molecular weight of the resin component in the obtained composition was determined by vapor pressure osmometer, it was 7,600 whereby it was conferred that 7% of the entire resin bonded to the carbon black.

On account of high carbon black content, the mixture before initiation of the reaction was a wet mass and stirring was almost impossible. However, within 2 hours after initiation of the reaction the mixture abruptly came to have fluidity and thereafter stirring became smooth.

When measured by a concentric-type rotary cylinder viscometer, the so obtained composition showed almost complete Newtonian flow as shown by curve $a$ in FIGS. 1 and 2. Curve $b$ was a curve of comparative sample obtained by separating the homopolymer by filtering the obtained composition through a layer of diatomaceous earth from said composition, and what kneaded the material carbon black by 3 rolls paint mill (hereinafter referred to as mechanical mixing or dispersion), wherein the concentration of the solid component and amount of carbon black in the solid component were made same as those of the action product, which showed remarkable thixotrophy, depicting a hysteresis loop having a considerably large yield value in FIG. 2.

The dispersion stability of the so obtained composition was far more excellent than that of the comparative sample and even when said composition was subjected to a centrifugal separator at a speed of 16,000 r.p.m. for 1 hour, it was not possible to completely precipitate the dispersoid, while on the other hand, the comparative sample completely precipitated under much milder condition to give a colorless transparent supernatant liquid.

This composition was suitable for blending with an electroconductive paint.

In case the polymerization initiator was not added dividedly, but the whole amount thereof was added at one time, on account of sudden rise of the reaction temperature, control of the reaction became difficult, at the same time, the final conversion remained below 80%. In this case, it was learned that the reaction product lacked dispersion stability.

EXAMPLE 2

A reaction vessel equipped with a stirrer was charged with 100 parts of furnace black (APF grade: oil absorption: 168 cc./100 g., pH: 7.8, iodine adsorption amount: 30 mg./g.), 8 parts of butyl methacrylate, 2 parts of methacrylic acid, 160 parts of ethylene glycol monomethylether and 0.4 part of 2,2'-azobisisobutyronitrile and polymerization reaction was initiated at 85° C. in nitrogen atmosphere with slow stirring. Four hours after initiation of the reaction, conversion became 42%, where further 0.6 part of 2,2'-azobisisobutyronitrile was added and the reaction was made to proceed and 5 hours after the conversion could be made 98%. Change of fluidity of the reaction mixture was about same as that in Example 1.

The molecular weight of the free polymer according to vapor pressure osmometer was 6,000. The composition immediately after it was synthesized was measured by a concentric rotary cylinder type viscometer to give a curve very close to Newtonian flow as shown in Example 1.

This composition could be easily blended with a paint as an electroconductive pigment and by blending this composition with epoxy resin, etc. this composition could be made a thermosetting electroconductive paint.

EXAMPLE 3

A reaction vessel equipped with a stirrer whose internal atmosphere was replaced by nitrogen was charged with 100 parts of furnace black (HAF grade: oil absorption: 145 cc./100 g., pH: 8.5, iodine adsorption: 96 mg./g.), 100 parts of distilled and purified styrene, 200 parts of toluene and 0.5 part of 2,2'-azobisisobutyronitrile, and the contents were reacted at 80° C. for 3 hours. Within 2 hours after initiation of the reaction dispersion of the reaction mixture remarkably changed and came to show fluidity. However, with combination of this monomer with the initiator, increase in conversion was slow and the conversion at the first stage was 12%, where further 0.5 part of the initiator was added and 3 hours after the conversion was made 41%, where still further 0.5 part of the initiator was added and 10 hours after initiation of the reaction, the conversion became 75%, where the reaction temperature was raised to 100° C. and by carrying out the reaction for 18 hours, the polymerization was nearly completed and it was possible to make the conversion 98%.

When the so obtained liquid composition was measured by a concentric rotary cylinder type viscometer, it showed fluidity close to Newtonian flow and its stability when it was left to stand was far superior to that of a mixed sample for comparison obtained by mere mechanical dispersion. As to its use, it was used for blending as an electroconductive pigment and it was suitable as a resistor.

EXAMPLE 4

A reaction vessel equipped with a stirrer filled with nitrogen was charged with 100 parts of channel black (MCC grade: oil absorption: 110 cc./100 g., pH: 4.5), 200 parts of methyl methacrylate and 0.5 part of 2,2'-azobisisobutyronitrile, and the resultant slurry was reacted at 60–70° C. with slow stirring. Within 2 hours after initiation of the polymerization, the reaction mixture became a liquid dispersion, where the temperature of the reaction mixture was cooled to room temperature. Another similar reaction vessel was charged with 1000 parts of water to which 2.2 parts of a 20% potassium polymethacrylate and 10 parts of sodium phosphate were added as dispersing agent and well dissolved therein. Thereafter, the aqueous solution was well stirred, to which said carbon black mixture further added with 0.5 part of the initiator was added and dispersed therein, the resultant mixture was reacted at 70° C. for 5 hours with stirring and at 85° C. for 1 hour, the obtained granular composition was separated by filtration and washed with water. The so obtained wet granular solid composition was soluble in a solvent dissolving methyl polymethacrylate, for instance, benzene and formed a stable dispersion. What dissolved this composition in methyl isobutyl ketone so that the solid component might become 50% showed fluidity close to Newtonian flow.

As to its use, it was used as a black pigment for plastic or paint or as an antistatic agent.

EXAMPLE 5

The liquid polymerization mixture containing carbon black at the first stage in Example 4 was further added with 0.5 part of 2,2'-azobisisobutyronitrile, the resultant mixture was poured into a cell consisting of 2 sheets of reinforced glass and spacers, the air was excluded and the cell was sealed, said cell was placed inside a constant temperature water bath, the contents were polymerized at 70° C. for 10 hours, and at 95° C. for 1 hour, left to stand to cool, thereafter taken out from the cell. The so obtained product can be pulverized into wet chips. The properties to the solvent, dispersing stability and fluidity of the solvent dispersion were same as in Example 4.

EXAMPLE 6

In this example, a case of using N,N-diethylaminoethyl methacrylate will be explained.

A reaction vessel equipped with a stirrer was replaced of its internal atmosphere with nitrogen and charged with 100 parts of furnace black (GPF grade: oil absorption: 160 cc./100 g., pH: 8.0, iodine adsorption: 29 mg./g.), 100 parts of N,N-diethylaminoethyl methacrylate, 200 parts of methyl isobutyl ketone as solvent and 1 part of 2,2'-azobisisobutyronitrile, the contents were polymerized at 80° C. for 3 hours and when conversion became 75%, further 1 part of 2,2'-azobisisobutyronitrile was added and the resultant mixture was reacted for 3 hours to make the conversion 98%. In this case, comparison and examination with a sample obtained by mechanical mixing were carried out by using a concentric rotary cylinder type viscometer, and in both cases dilatancy was shown, and especially that of the reaction product was remarkable. However, when stability when being left to stand was examined, it was understood that the mechanical mixture was far inferior to the polymerization product.

EXAMPLE 7

A reaction vessel equipped with a stirrer whose internal atmosphere was replaced by nitrogen was charged with 200 parts of furnace black (APF grade: oil absorption: 168 cc./100 g., pH: 7.8, iodine adsorption: 30 mg./g.), 140 parts of butyl acrylate, 30 parts of diethylaminoethyl methacrylate, 30 parts of acrylamide, 360 parts of methyl isobutyl ketone, 40 parts of butyl alcohol and 0.6 part of 2,2'-azobisisobutyronitrile, the contents were polymerized at 80° C. for 3 hours, further 2 parts of azobisisobutyronitrile were added, and the resultant mixture was polymerized for 2 hours to complete the polymerization. The obtained carbon black composition has good fluidity, excellent dispersion stability and even when treated by a centrifuge at 16,000 r.p.m. for 1 hour it was impossible to completely precipitate the composition. For the purposes of comparison, an interpolymer obtained from said monomers was separately synthesized, in a solution of which the same carbon black was mechanically dispersed, and stability of the obtained mixture was examined. The same centrifuge was used and when rotation reached 16,000 r.p.m. the switch was turned off. After the stop of said separator, when the mixture was taken out, it was completely precipitated and separated.

EXAMPLE 8

The produce of Example 7 was added with 63 parts of a butanol solution of formaldehyde (formaldehyde: 40%) and 0.5 part of maleic anhydride, the mixture was reacted for 3 hours under reflux with a water separator provided and the water formed was taken out of the mixture as an azeotrope. The so obtained composition into which N-methylol group was introduced was excellent in dispersion stability as in Example 7 and was especially suitable as a thermosetting electroconductive paint alone or by mixing with a thermosetting resin.

EXAMPLE 9

A reaction vessel equipped with a stirrer whose internal atmosphere was replaced by nitrogen was charged with 100 parts of furnace black (APF grade: oil absorption: 168 cc./100 g., pH: 7.8, iodine adsorption: 30 mg./g.), 20 parts of butyl acrylate, 5 parts of acrylic acid, 160 parts of ethylene glycol monomethylether and 0.3 part of 2,2'-azobisisobutyronitrile, and the contents were reacted at 80° C. with mild stirring. Two hours after initiation of the polymerization, fluidity of the mixture increased, facilitating the stirring. Four hours after initiation of the polymerization, 0.4 part of azobisisobutyronitrile was added, further 2 hours after that, 0.4 part of azobisisobutyronitrile was added, namely, the polymerization was carried out for total 8 hours to make the conversion 99.5%.

The so obtained composition was poured per se into an aqueous ammonia solution containing ammonia in an amount above 0.5 time of an acid equivalent thereby forming a good dispersion.

EXAMPLE 10

When a composition synthesized in ethylene glycol monomethylether as in Example 9 was poured into large excess of water treated with ion exchange resins, the solid component separated as precipitate. Said precipitate was dehydrated by a basket-type centrifugal dehydrator having a diameter of 60 cm. (1,700 r.p.m.), washed with water and rinsed thereby a wet cake containing 49.5% solid was obtained.

By adding 1/30 part by weight of monoethanol amine to said solid, said solid could be made an aqueous paste without adding water.

By diluting a part of said aqueous paste with water, it was possible to make said paste a liquid dispersion having good dispersion stability.

EXAMPLE 11

By adding 1/30 part by weight of triethylamine to the wet cake of 49.5% solid content from Example 10, it was possible to make said solid an aqueous paste without adding water. This aqueous paste formed a liquid dispersion having good dispersion stability by diluting said paste with water, which dispersion was used as a black pigment for an electrophoretic paint.

EXAMPLE 12

A reaction vessel equipped with a stirrer whose internal atmosphere was replaced by nitrogen was charged with 100 parts of furnace black (GPF grade: oil absorption: 160 cc./100g., pH: 8.0, iodine adsorption: 29 mg./g.), 10 parts of diethylaminoethyl methacrylate, 158 parts of dimethyl formamide and 0.5 part of 2,2'-azobisisobutyronitrile, and the contents were polymerized at 85° C. for 3 hours, further 0.5 part of 2,2'-azobisisobutyronitrile was added and the resultant mixture was reacted for 4 hours. The initial hard slurry came to have fluidity during the polymerization and could be stirred easily. Conversion upon completion of the polymerization was 98.5%.

To a small amount of the so obtained composition, equivalent of acetic acid was added, and when the mixture was diluted with water or an aqueous solution of 10% acetic acid, said composition could be made an aqueous dispersion having good dispersion stability, which dispersion could not completely be precipitated even when it was treated by a centrifuge at 12,000 r.p.m. for 30 minutes.

EXAMPLE 13

A reaction vessel equipped with a stirrer whose internal atmosphere was replaced by nitrogen was charged with a mixture of 100 parts of furnace black (HAF grade: oil absorption: 145 cc./100g., pH: 8.5, iodine adsorption: 96 mg./g.), 8 parts of N,N-diethylaminoethyl methacrylate, 12 parts of acrylonitrile, 160 parts of N,N-dimethyl formamide and 0.5 part of 2,2-azobisisobutyronitrile, and the mixture was polymerized at 80° C. for 3 hours. At this point, already fluidity was great and stirring was easy. The polymerization mixture as added with 0.5 part of 2,2-'azobisisobutyronitrile and the resultant mixture was polymerized for 3 hours, further 0.2 part of 2,2'-azobisisobutyronitrile was added thereto and the polymerization was carried out for 2 hours, whereby conversion was made 99%.

The obtained composition dispersed in a 10% acetic acid aqueous solution or 0.1 N hydrochloric acid to form a stable dispersion.

EXAMPLE 14

To the composition synthesized in Example 12, excess methyl iodide was added and well mixed therewith, then solid separated from liquid phase. The composition becoming quaternary ammonium salt so obtained was separated by filtration. When the obtained wet solid was poured into warm water and stirred, a stable aqueous dispersion was formed.

What is claimed is:

1. A process for preparing a carbon black synthetic resin composition which comprises contacting at least one α,β-ethylenically unsaturated monomer polymerizable with free radicals with a polymerization initiator in the presence of carbon black, characterized in that said initiator, selected from the group consisting of azo compounds and peroxide compounds, is added in at least two increments, the first increment prior to the initiation of the polymerization reaction, and a subsequent increment after monomer conversion of from 1 to 50% and after fluidity of the reaction mixture increases, said initiator being added in an amount of 0.1 to 10% by weight based on the monomer, and said first initiator increment containing 10 to 75% of the total initiator used, said carbon black being present in an amount of 30 to 95% by weight of the carbon black synthetic resin composition.

2. The process of claim 1 wherein said α,β-ethylenically unsaturated monomer is contacted with said initiator for a period sufficient to convert at least 95% of said monomer to a polymer.

3. The process of claim 1 wherein an inert liquid medium capable of dissolving said initiator, said monomer and the produced free-polymer is present in the polymerization system.

4. The process of claim 1 wherein said α,β-ethylenically unsaturated monomer is selected from the group consisting of acrylonitrile, styrene and vinyl acetate.

5. A process for preparing a carbon black-synthetic resin composition which comprises polymerizing at least one free radical-polymerizable α,β-ethylenically unsaturated monomer of the formula:

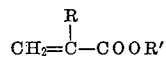

in which R stands for a member selected from the group consisting of hydrogen, and methyl group, and R' stands for a member selected from the group consisting of hydrogen atom, hydrocarbon radicals of 1 to 16 carbon atoms, hydrocarbon radicals substituted with a hydroxyl group, glycidyl group and N,N-dialkylaminoalkyl group, with a free radical-polymerization initiator in the presence of carbon black, characterized in that said initiator, selected from the group consisting of azo compounds and peroxide compounds, is added in at least two increments, the first increment prior to the initiation of the polymerization reaction, and a subsequent increment after monomer conversion of from 1 to 50% and after fluidity of the reaction mixture increases, said initiator being added in an amount of 0.1 to 10% by weight based on the monomer, and said first initiator increment containing 10 to 75% of the total initiator used, said carbon black being present in an amount of 30 to 95% by weight of the carbon black synthetic resin composition.

6. A process for preparing a carbon black-synthetic resin composition having an improved dispersibility in water which comprises polymerizing a free radical-polymerizable α,β-ethylenically unsaturated monomer selected from the group consisting of (a) an α,β-ethylenically unsaturated carboxylic acid and (b) a mixture thereof with other α,β-ethylenically unsaturated monomer, with a free radical-polymerization initiator in the presence of carbon black, characterized in that said initiator, selected from the group consisting of azo compounds and peroxide compounds, is added in at least two increments, the first increment prior to the initiation of the polymerization reaction, and a subsequent increment after monomer conversion of from 1 to 50% and after fluidity of the reaction mixture increases, said initiator being added in an amount of 0.1 to 10% by weight based on the monomer, and said first initiator increment containing 10 to 75% of the total initiator used, said carbon black being present in an amount of 30 to 95% by weight of the carbon black synthetic resin composition; and then reacting the so obtained carbon black-synthetic resin composition with ammonia, a water-soluble amine or a lower alkyl amine in an amount at least 0.5 time as large as the amount equivalent to the acid, in the presence of water.

7. A process for preparing a carbon black-synthetic resin composition having an improved dispersibility in water which comprises polymerizing a free radical-polymerizable $\alpha,\beta$-ethylenically unsaturated monomer selected from the group consisting of (a) an $\alpha,\beta$-ethylenically unsaturated compound having a dialkyl aminoalkyl group and (b) a mixture thereof with other $\alpha,\beta$-ethylenically unsaturated monomer, with a free radical-polymerization initiator in the presence of carbon black, characterized in that said initiator, selected from the group consisting of azo compounds and peroxide compounds, is added in at least two increments, the first increment prior to the initiation of the polymerization reaction, and a subsequent increment after monomer conversion of from 1 to 50% and after fluidity of the reaction mixture increases, said initiator being added in an amount of 0.1 to 10% by weight based on the monomer, and said first initiator increment containing 10 to 75% of the total initiator used, said carbon black being present in an amount of 30 to 95% by weight of the carbon black synthetic resin composition; and thereafter reacting the so obtained carbon black-synthetic resin composition with methyl iodide or dimethyl sulfate to form a quaternary ammonium salt thereof.

8. A process for preparing a carbon black-synthetic resin composition having an improved dispersibility in water which comprises polymerizing a free radical-polymerizable $\alpha,\beta$,ethylenically unsaturated monomer selected from the group consisting of (a) an $\alpha,\beta$-ethylenically unsaturated compound having a dialkyl aminoalkyl group and (b) a mixture thereof with other $\alpha,\beta$-ethylenically unsaturated monomer, with a free radical-polymerization initiator in the presence of carbon black, characterized in that said initiator, selected from the group consisting of azo compounds and peroxide compounds, is added in at least two increments, the first increment prior to the initiation of the polymerization reaction, and a subsequent increment after monomer conversion of from 1 to 50% and after fluidity of the reaction mixture increases, said initiator being added in an amount of 0.1 to 10% by weight based on the monomer, and said first initiator increment containing 10 to 75% of the total initiator used, said carbon black being present in an amount of 30 to 95% by weight of the carbon black synthetic resin composition; and thereafter reacting the so obtained carbon black-synthetic resin composition with an acid to form a salt thereof.

References Cited
UNITED STATES PATENTS

| | | | |
|---|---|---|---|
| 3,053,779 | 9/1962 | O'Neill | 260—29.6(H) |
| 3,054,762 | 9/1962 | Rees | 260—29.6(EM) |
| 3,117,943 | 1/1964 | Corbiere et al. | 260—41 |
| 3,265,658 | 8/1966 | Liethen et al. | 260—41 |

MURRAY TILLMAN, Primary Examiner

W. J. BRIGGS, SR., Assistant Examiner

U.S. Cl. X.R.

106—307; 117—226; 260—32.8, 33.2, 80, 80.73, 80.81, 86.1, 89.5, 93.5